United States Patent [19]

Staamann

[11] 3,739,970

[45] June 19, 1973

[54] TRANSPORT HEAD ON COLLATING MACHINES FOR ENDLESS FORMS

[75] Inventor: Otto Staamann, Berlin, Germany

[73] Assignee: Firma Automatic Druckmaschinenfabrik, Berlin, Germany

[22] Filed: Apr. 20, 1972

[21] Appl. No.: 245,908

[30] Foreign Application Priority Data
July 8, 1971 Germany.................P 21 34 666.7

[52] U.S. Cl..................................... 226/75, 226/100
[51] Int. Cl............................................. B65h 17/38
[58] Field of Search ...................... 226/74, 75, 170; 226/100

[56] References Cited
UNITED STATES PATENTS
3,152,742  10/1964  Wright................................ 226/74
3,688,959  9/1972  Staneck et al....................... 226/75

Primary Examiner—Allen N. Knowles
Attorney—John J. McGlew and Alfred E. Page

[57] ABSTRACT

A transport head on collating machines for transporting endless forms having edges with perforations, comprises a geared conveyor belt driven by one of two spaced apart gears with at least one being adjustable to permit stretching and or relaxing of the belt in order to vary the spacing of engagement spikes on the belt. The spikes engage into perforations on the forms and are adjustable to accommodate variations in the perforation spacing on the form.

7 Claims, 5 Drawing Figures

PATENTED JUN 19 1973 3,739,970

TRANSPORT HEAD ON COLLATING MACHINES FOR ENDLESS FORMS

BACKGROUND OF THE INVENTION

1. Field of the Invention

This invention relates in general to conveying devices and, in particular, to a new and useful transport head on collating machines for endless forms having perforations along an edge which are engageable with spikes or projections on an endless conveyor which is driven by spaced gear elements which may be adjusted relative to each other to change the length of the stretchable endless belt.

2. Description of the Prior Art

The invention has particular application to the construction of transport heads which are used on collating machines for moving endless forms which have long sides with edge perforations which are engageable with projections or spikes of an endless conveyor belt in order to transport the forms. Transport heads of this general characteristic are arranged in collating machines at both sides of the endless forms which run therethrough and usually two of these transport heads are provided on each side or a total of four such transport heads. The drive wheels of two opposite transport heads generally have a common drive effected by a drive shaft which is mounted crosswise to the transport direction of the endless forms in the framework of the collating machine. There are two of these drive shafts which are arranged one behind the other in the running direction of the endless forms and in spaced relation to the transport heads which are interconnected with respect to their transmissions. The endless forms run through the collating machine at a linear transport speed of about 100 m per minute. In order to avoid disturbances, the distances between the holes of the edge perforations in the endless forms must coincide very exactly with the spacing of the spikes in the conveyor belts which engage into the openings.

The division is generally standardized. Until now, proceeding from the known standard division in coincidence with the division of the edge perforations in the endless forms, one has used a fixed division at the conveyor belts and such belts generally comprise fixed chain links with each chain link carrying a spike or projection adapted to engage in an opening of the perforated edge of the forms. The spikes spaced at a standard division presuppose that also the edge perforations are punched at a standard division. The punching of the edge perforations is generally done in the printing machine so that the printed endless forms come out of the printing machines with the edge perforations.

The existing division of the edge perforations in the endless forms can no longer show deviations from the standard divisions.

The deviations which occur may have different causes. The deviations may be due to defect of the punching tools or to the effect of moisture on the paper of which the endless forms are made up. It is known that the paper stretches with increasing moisture content of the air. If the distances between holes vary in relation to the standard division, this results in disturbances in the collating machine. The spikes of the conveyor belts may tear open the different edge perforations in the endless forms which, at high transport speeds, may lead to the blocking of the collating process. In these cases, the speed of the transport mechanism must be materially reduced. However, the division defects have not been eliminated by this measure.

SUMMARY OF THE INVENTION

In accordance with the present invention, there is provided a transport head which is adjustable to a division differing from the standard division and which permits deviations of the division of the edge perforations to be corrected with simple means and without having expensive exchange of parts. This is solved by the present invention by providing a stretchable endless belt which is guided over two gear wheels which are spaced apart and with at least one of them being adjustably positionable so as to vary the length of the endless belt by stretching or relaxing the belt. By such an arrangement, differences of divisions and deviations from the standard division of the engaging spikes along the length of the belt can be accommodated. With increasing belt tension, the stretch of the conveyor belt and thus proportionally the mutual spacing between the spikes increases. Slacking of the belt tension causes a division variation in the opposite direction, that is, the spacing between the spikes decreases. The adjustment is advantageously made at all of the transport heads of the collating machine.

With the inventive means, the spacing between the engagement spikes of the conveyor belts can be changed at will to ensure that they will run through the openings of the perforations of the forms which are advanced in the collating machines and without disturbance and at the usual high transport speeds. The arrangement ensures a proper feeding of forms even though the papers are very thin. A trouble-free collating of endless forms under all conceivable operating conditions is therefore ensured. The capacity of the collating machine is fully utilized.

The mounting is such that the idler gear is adjustably mounted in respect to the driving gear and for this purpose, the bearing for the idler gear is mounted on an adjustable eccentric which may be rotated and which may be positioned accurately by reference to a scale mounted directly on the machine frame. Starting from the zero position of the eccentric for the standard division, it is possible to test the spacing by placing and endless form in position on the collater and noting whether the spikes of the conveyor coincide with the edge perforations of the forms. If they do not, the eccentric is readjusted in one or the other directions in accordance with whether the spacing is insufficient or too great. The amount of adjustment which is made on one drive head is then used as a value to correct all of the others.

In order to improve the stretchability of the conveyor belts in both directions, elastic traction bands are embedded in the conveyor belt on both sides of the spikes and these comprise a rubber-like plastic. These traction bands have less stretch than the conveyor belt. The traction bands may comprise, for example, an elastically stretchable plastic web. The spikes may be inserted in holes in the conveyor belt and these may also be constructed so that they are exchangeable.

Because only slight differences in the order of some few tenths of a millimeter occur in the necessary adjustments, the elongation of the conveyor belt and that of the traction bands is never beyond the elastic limit. When the adjusting scale is set back to zero, the spikes of the conveyor belts are again in the standard division.

Accordingly, it is an object of the invention to provide a transport head on collating machines for transporting endless forms having edges with perforations and which comprises an endless conveyor belt which is mounted to engage around a rotatable drive wheel and rotatable idler gear and which includes a mounting for one of the gears which is adjustable in order to stretch or relax the conveyor band for the purpose of shifting the spacing of projections carried on the band so that they will engage the endless forms at precise locations aligned with the perforations.

A further object of the invention is to provide a stretchable conveyor belt having engagement teeth for cooperation with drive gears and which includes longitudinally extending plastic elements therein for controlling the stretch of the belt arranged on each side of an opening to receive projecting spikes which provide means for engagement into openings of an endless form which is adapted to be moved in a collating machine.

A further object of the invention is to provide a transport head on collating machines for transporting endless forms which is simple in design, rugged in construction and economical to manufacture.

The various feautres of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

GENERAL DESCRIPTION OF THE PREFERRED EMBODIMENTS

Figure 1:
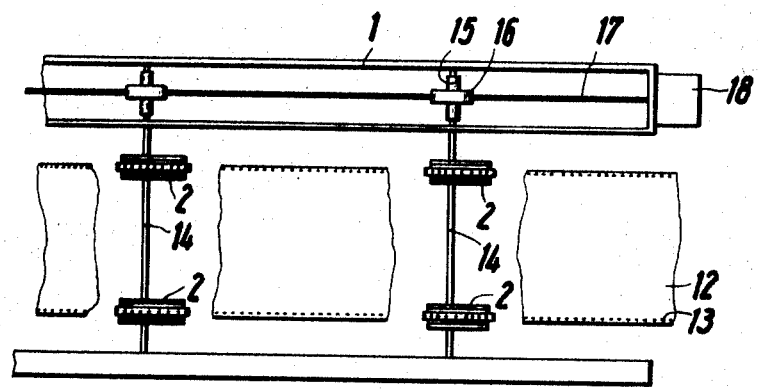
FIG. 1 is a partial top plan view of a collating machine having transport heads constructed in accordance with the invention.

Referring to the drawings in particular, the invention embodied therein comprises, a collating machine which includes a frame 1 on which are rotatably supported transport head drive shafts 14 which extend transversely across the frame beneath endless forms 12 which are adapted to move along the frame. The drive shafts 14 are associated with two transport mechanisms 2,2 each and total of four transport mechanisms are shown in the machine indicated in FIG. 1.

Each transport head includes its own frame 3 which is arranged for crosswise displacement on a traverse 4 which is mounted in the frame 1. The frame 3 contains the drive wheel 5 which is rotatably mounted on the drive shaft 14 for rotation therewith and which drives a conveyor belt 8 which is made of a stretchable material such as a plastic. The conveyor is guided around an idler gear 6. The gears 5 and 6 have teeth 7 which engage with corresponding teeth 7' of the endless conveyor 8.

Figure 4:
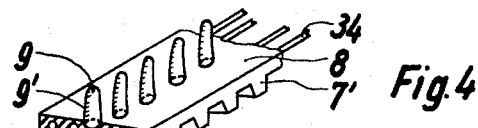
FIG. 4 is a partial perspective view of the construction of an endless conveyor belt for the device shown in FIG. 1.
Figure 3:
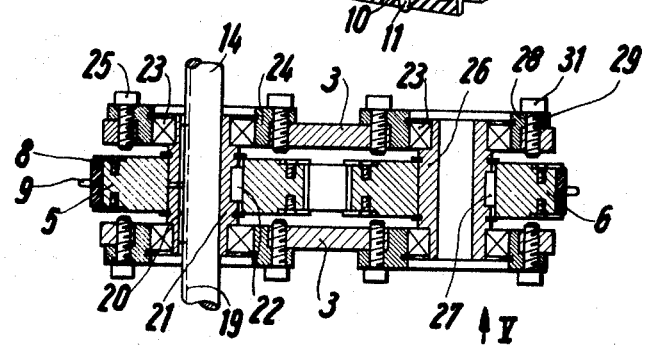
FIG. 3 is a section taken along the line 3—3 of FIG. 2.

In accordance with the invention, the endless conveyor 8 is provided with projections or spikes 9 which extend outwardly from the periphery thereof and which are adapted to engage in perforations 13 defined along the edges of the endless forms 12. As best indicated in FIG. 4, the endless conveyor 8 includes openings or bores 10 which receive a shank 11 of each spike 9. The spikes 9 also include a cylindrical portion 9' having a height greater than the thickness of the stacked endless forms 12 to be collated. The drive for each transport head is obtained from the common main drive shaft 17 which is driven by a motor 18 and which drives through helical gears 15 and 16 to the cross shafts 14 of each pair of transport heads 2. As best seen in FIG. 3, the drive shaft 14 has a longitudinal groove 19 which receives a key 20 of a sleeve 21. The sleeve 21 is connected non-rotatably with the drive gear 5 through a fitting key 22. The sleeve 21 is rotatably mounted on ball bearings 23 and it carries the drive gear 5. The ball bearings 23 are carried in a socket 24 which is secured to the frame 3 by threaded screws or bolts 25.

The idler gear or deflecting gear 6 is connected non-rotatably with a sleeve 26 by a fitting key 27. Sleeve 26 is mounted in ball bearings 23.

In accordance with the invention, adjustment means are associated with the mountings for the gears 5 and 6 which, in the embodiment shown, comprises an eccentric adjustment for the idler gear 6, and for this purpose, the socket 28 is designed as an eccentric and is rotationally adjustable. For this purpose, the flange 29 carries arcuate slots 30 for clamping screws 31 which are threaded into threaded holes in the frame 3. A scale 32 is defined on the periphery of the flange 29 and it includes a fixed index 33. Alternatively, the index 33 may be arranged on the flange and the scale on the frame. By adjustment of the eccentric, the distance between the gear centers may be varied in the order of magnitude of the occurring differences of the whole spacings which receive the spikes 9.

In order that the adjustment may be satisfactory, the conveyor belt 8 must be elastically stretchable on the free length between the gears 5 and 6. The stretching must be uniform because the belt is positively driven by the engagement of the teeth 7 and 7' and the conveyor belt thus advantageously comprises an elastically stretchable material, preferably, a rubber-like plastic. As indicated in FIG. 4, an embodiment of the belt 8 comprises several traction bands 34 which extend longitudinally through the conveyor belt on each side of the spikes 9. These traction bands 34 have less stretch than the material of the conveyor itself. In this manner, the stretchability of the conveyor belt is maintained within limits which correspond to the possible division deviations of the edge perforations 13 of the endless forms 12. The traction bands 34 may also comprise a suitable plastic. If the conveyor belt itself meets the requirement of stretchability and resilience, the traction bands 34 may be omitted.

Figure 2:
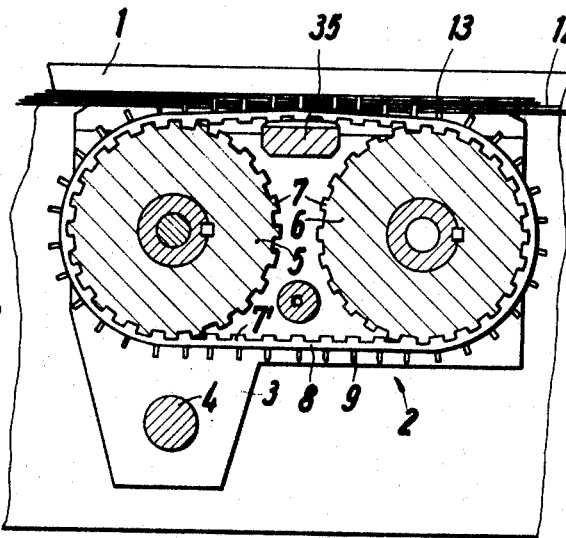
FIG. 2. is an enlarged partial section taken along the line 2—2 of FIG. 1.
Figure 5:
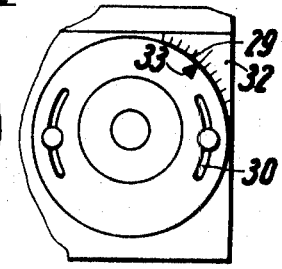
FIG. 5 is a partial side elevation of a portion of the machine shown in FIG. 3.

As shown in FIG. 2, the belt advantageously runs over a traverse 35 located between the gears 5 and 6 and located at a level high enough to lift the belt somewhat so that the spikes 9 will enter into the perforations more easily.

While specific embodiments of the invention have been shown and described in detail to illustrate the application of the principles of the invention, it will be understood that the invention may be embodied otherwise without departing from such principles.

What is claimed is:

1. A transport head on collating machines for transporting endless forms having edges with perforations, comprising a rotatable drive gear, a rotatable idler gear spaced from said drive gear, mounting means for rotatably mounting said drive gear and said idler gear at respective spaced locations adjacent the endless forms, an endless stretchable conveyor belt engaged around said gears and having a plurality of projections thereon engageable with the respective perforations of the endless forms, and adjustment means associated with said mounting means for adjusting the spacing between said gears and for selectively and alternatively stretching and relaxing said conveyor belt for varying the spacing between said projections.

2. A transport head on collating machines, according to claim 1, wherein said adjustment means comprises a bearing for rotatably supporting one of said drive gear and said idler gear, and a rotatable member eccentrically carrying said bearing and being rotatably mounted for positioning at a selected rotational position for bearing the spacing between the axes of said gears.

3. A transport head on collating machines, according to claim 2, including a scale associated with said rotatable eccentric.

4. A transport head on collating machines, according to claim 1, wherein said endless conveyor belt includes a plurality of elastic traction bands embedded therein extending longitudinally, at least one band being on each side of said spike.

5. A transport head on collating machines, according to claim 4, wherein said belt comprises a material having a greater stretch capability than said bands.

6. A transport head on collating machines, according to claim 1, wherein said conveyor belt includes a plurality of holes therethrough arranged at spaced locations along the length thereof, said spikes comprising members inserted into said holes and being exchangeable.

7. A stretchable conveyor gear belt for use in a transport head on collating machines comprising an endless belt having an interior surface with spaced gear teeth thereon and an exterior surface, a plurality of openings extending through the exterior surface to the interior surface along the length of said belt, a spike in each of said openings including a portion extending through the opening and a cylindrical portion extending above the opening, said belt being made of an elastic material and having a plurality of longitudinally extending bands therethrough extending on respective sides of said spikes and being made of a material which is less elastic than the material of said conveyor belt.

* * * * *